United States Patent
Hong

(10) Patent No.: US 8,387,650 B1
(45) Date of Patent: Mar. 5, 2013

(54) AUTO DECOMPRESSION VALVE

(76) Inventor: David Chi Ying Hong, Causeway Bay (HK)

( * ) Notice: Subject to any disclaimer, the term of this patent is extended or adjusted under 35 U.S.C. 154(b) by 0 days.

(21) Appl. No.: 13/217,474

(22) Filed: Aug. 25, 2011

(30) Foreign Application Priority Data

Aug. 12, 2011 (HK) .................................. 11108507.6

(51) Int. Cl.
*F16K 15/20* (2006.01)
(52) U.S. Cl. ..................................... 137/224; 137/493.7
(58) Field of Classification Search .................. 137/223, 137/224, 226, 493.7
See application file for complete search history.

(56) References Cited

U.S. PATENT DOCUMENTS

| | | | | | |
|---|---|---|---|---|---|
| 1,156,328 | A | * | 10/1915 | Thayer | 137/226 |
| 1,729,469 | A | * | 9/1929 | Anderson | 137/224 |
| 1,837,970 | A | * | 12/1931 | Jones | 137/226 |
| 2,254,655 | A | * | 9/1941 | Hollowell | 137/226 |
| 2,593,423 | A | * | 4/1952 | Eastman | 137/226 |
| 3,285,274 | A | * | 11/1966 | Bouvier | 137/322 |
| 3,450,147 | A | * | 6/1969 | Webb | 137/226 |
| 3,910,305 | A | * | 10/1975 | Hughes | 137/224 |
| 5,954,081 | A | * | 9/1999 | Everhard et al. | 137/68.23 |
| 7,624,752 | B2 | * | 12/2009 | Huang | 137/226 |
| 2007/0023083 | A1 | * | 2/2007 | Huang | 137/226 |
| 2008/0047613 | A1 | * | 2/2008 | Huang | 137/226 |

* cited by examiner

*Primary Examiner* — John Rivell
*Assistant Examiner* — R. K. Arundale
(74) *Attorney, Agent, or Firm* — Raymond R. Ferrera; Adams and Reese LLP

(57) ABSTRACT

An auto compression valve, comprising a rear housing with an air release hole; a front housing screwed with the rear housing; a taper piston moveably mounted in the rear housing; a spring mounted in the front housing, wherein one end of the spring is placed in the cavity of the front housing, another end is sleeved on the cylinder end of the taper piton; a lock ring with an air release groove fixed between the rear and front housings. Air release is realized through the air release hole and the air release groove, thus all parts of the valve can be assembled more tightly to prevent coming loose, maintaining the necessary pressure for inflating tires and controlling the air leaking flow in deflation.

8 Claims, 3 Drawing Sheets

AUTO DECOMPRESSION VALVE

CROSS-REFERENCE TO RELATED APPLICATIONS

Pursuant to 35 U.S.C. 119(a), the instant application claims priority to prior Hong Kong application number 11108507.6, filed Aug. 12, 2011.

TECHNICAL FIELD

The present invention is related to a decompression valve, and more particularly to an auto decompression valve.

PRIOR ART

Auto decompression valve is a valve which reduces the pressure at input to a desired pressure at output and automatically remains the output pressure in stable through the medium itself. A common auto decompression valve generally comprises a front housing, a rear housing, a taper piston and a spring, air release is realized by the gab between the front and rear housings. With this type of structure, if the housings are locked too tight, air can not go out through the gab of the parts; however if the housings are locked too loose, air will lose through this device in inflation, therefore the compressor connected can not create sufficient pressure for pumping tires.

Furthermore, at present the common auto air compression valves do not have extra gears for preventing the excessive contact area between the taper piston and the inner wall of the front housing, which may lead to piston sticking in the bore during tire inflation.

In addition to above, at present the materials of the housings of the common auto decompression valves are mainly polyamide, the materials of the taper piston are mainly rubber, the parts made of these materials are easy to come loose after assembled, and therefore can not meet the precision requirements.

According to above discussions, improvements to the existing valves are needed.

SUMMARY OF THE INVENTION

To solve the above mentioned problems, the object of the present invention is to provide an auto decompression valve with higher precision and better inflation and deflation effects.

The auto decompression valve disclosed by the present invention comprises: a rear housing with an air release hole; a front housing screwed with said rear housing; a taper piston moveably mounted in said rear housing; a spring, one of which end is disposed in a corresponding cavity of said front housing, and another end is sleeved on the cylinder end of said taper piston; a lock washer with an air release groove, which is secured between said front and rear housings; and a sealing washer mounted between said front housing and lock washer. Wherein, said lock washer is provided with an annular groove for receiving a first sealing O-ring; said front housing is provided with a hexagonal nut portion, and a rib within the cavity thereof, which defines a U shaped groove with the inner wall of said front housing, for receiving a second sealing O-ring; said rear housing has a hexagonal end plate with lock grooves, correspondingly said lock washer has lock flanges engaged with said lock grooves.

In addition, said rear and front housings are made of Nylon materials, while said lock washer and taper piston are made of copper-based powder metallurgy materials.

The valve disclosed by the present invention is an auto decompression valve, where a lock washer is secured between the rear and front housings, air goes out through the air release groove of the lock washer and the air release hole of the rear housing. Thus, the parts of the valve can be assembled tightly to prevent coming loose easily, and therefore maintain sufficient pressure in inflating; furthermore, the specified dimensions of the air release groove can control the air leaking flow effectively, therefore the inflation and deflation can be more effective. In addition, the rib of the front housing can prevent the taper piston from being stuck in the bore, while the grooves, sealing O-rings and the sealing washer can help hold the parts air tighter.

The lock flanges of the lock washer and corresponding lock grooves of the rear housing can secure the parts more tightly. The materials of rear and front housings, Nylon, have high temperature resistance, while the lock washer and taper piston are made of copper-based powder metallurgy materials. All these ensure high precision and tight assembly of the whole valve, thereby providing a more reliable and practical auto decompression valve.

DETAILED DESCRIPTION

Figure 1:
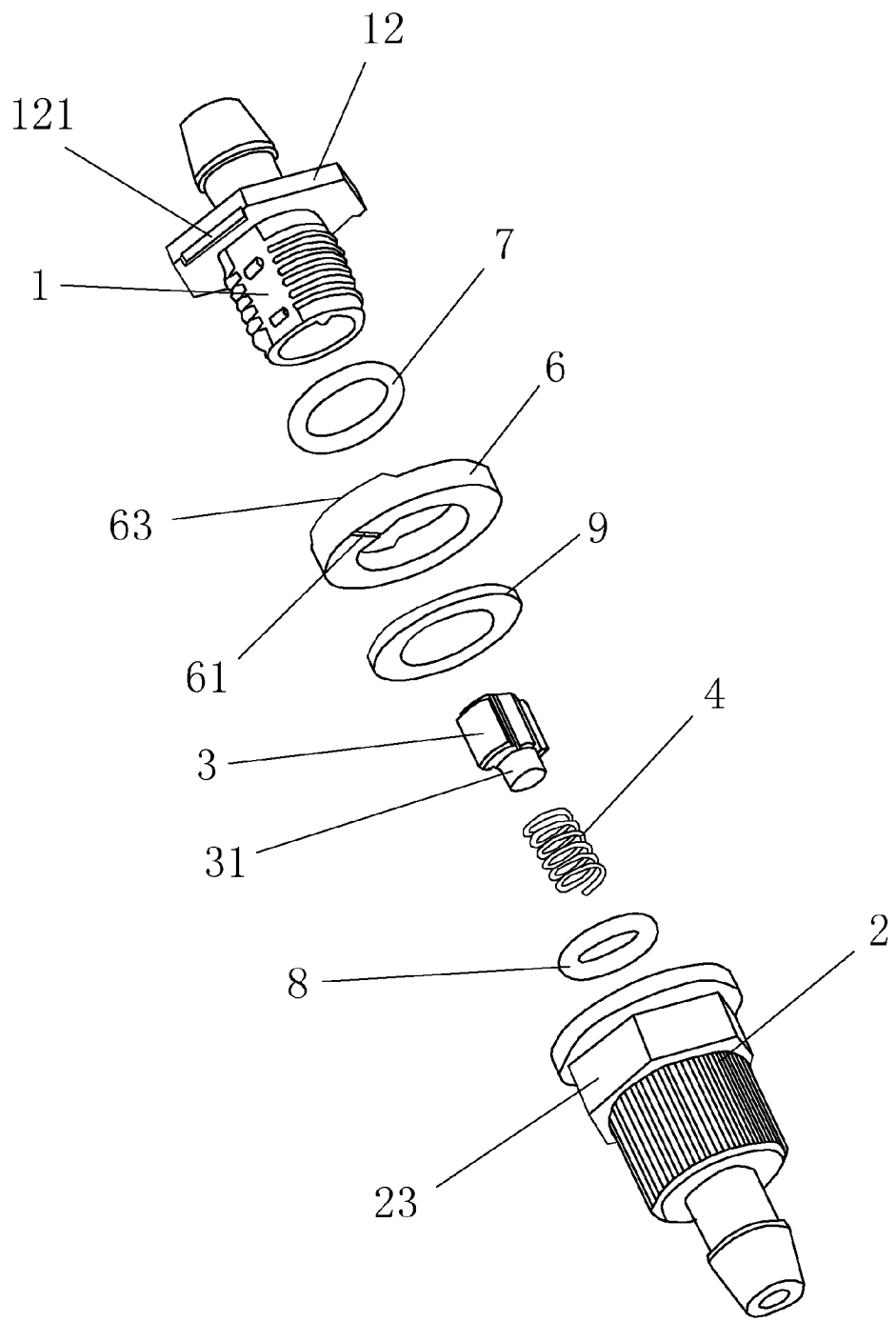
FIG. 1 is an exploded view of a valve according to the present invention.
Figure 2:
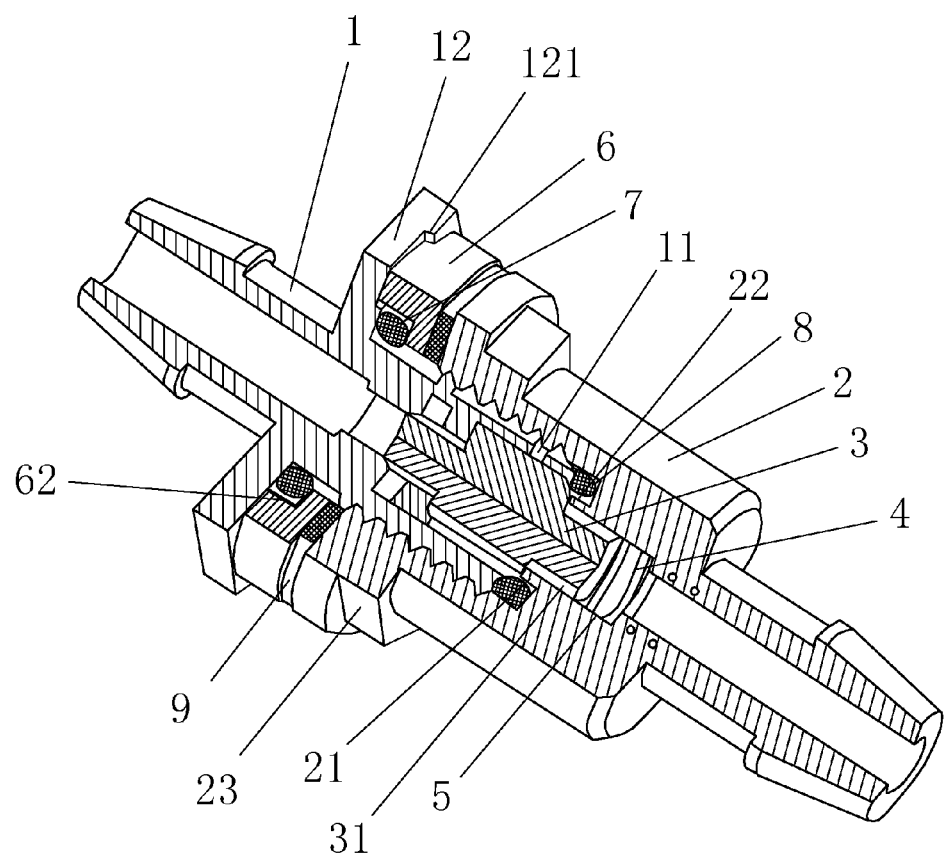
FIG. 2 is an internal schematic view of the valve in inflating state according to the present invention.

According to FIGS. 1 and 2, the auto decompression valve disclosed by the present invention comprises a rear housing 1, a front housing 2 screwed with the rear housing 1, a taper piston 3 movably mounted in the rear housing 1; wherein the rear housing 1 has a air release hole 11 on the front end thereof, a spring 4 is mounted in the front housing 2, one of which end is disposed in the cavity 5 of the front housing 2, which is matched with the shape of the spring 4, another end is sleeved on the cylinder end 31 of the taper piston; a lock washer 6 with a air release groove 61 is fixed between the rear housing 1 and the front housing 2.

Figure 3:
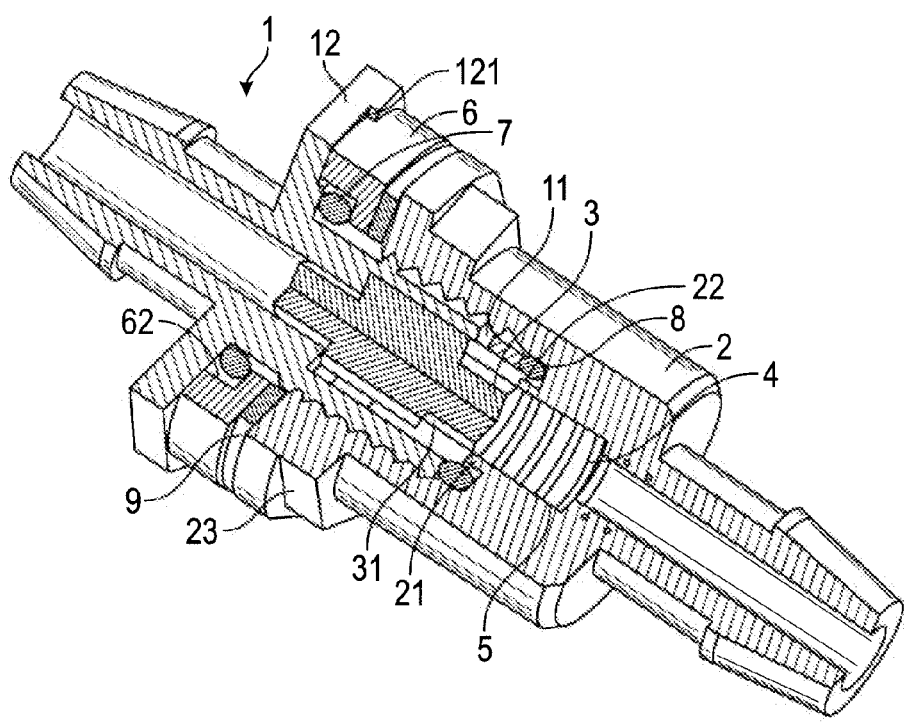
FIG. 3 is an internal schematic view of the valve in free deflating state according to the present invention.

Shown as FIGS. 2 and 3, during inflation, the compressor is operating, the taper piston 3 is moved towards the front housing 2 against the spring 4 by the compressed air, the air release hole 11 is so sealed by the taper piston 3, air goes through the air inlet of the rear housing 1 and the grooves on the surface of the taper piston 3 into the sealant bottle connected to the air outlet of the front housing 2, meanwhile only little air leaks through the air release hole 11 before the air release hole 11 is sealed. During deflation, the air in the sealant bottle releases when the compressor is not operating, as the taper piston 3 is moved back towards the rear housing 1 actuated by the compressed spring 3, the air release hole 11 is no longer sealed by the taper piston 3, the air from the sealant bottle can go out through the air release hole 11 and the air release groove 61.

Furthermore, the lock washer 6 is provided with a annular groove 62, where a first sealing O-ring 7 is mounted; the front housing 2 is provided with a rib 21 on the inner wall thereof, whereby the rib 21 and the inner wall of the front housing define a U shaped groove 22, where a second sealing O-ring 8 is mounted; the auto decompression valve provided by the present invention further comprises a sealing washer 9 between the lock washer 6 and the front housing 2. Thus, in inflating state, once the air release hole 11 is sealed by the taper piston 3, all gaps between the rear and front housing 1 and 2 are sealed by the sealing O-rings 7, 8 and the sealing washer 9, thereby ensuring sufficient pressure for inflating tires within the valve.

The rear housing 1 has a hexagonal end plate 12, with two symmetrical lock grooves 121 on the front side thereof; correspondingly the lock washer 6 has two matched lock flanges 63 on the back side thereof. In assembly, the lock washer 6 is mounted between the rear housing 1 and the front housing 2 which are secured with each other, wherein the lock grooves 121 of the rear housing 1 are engaged with the lock flanges 63 of the lock washer 6, all parts are tightly secured.

In addition, the hexagonal end plate 12 is for easy control in assembly, and the front housing 2 has a hexagonal nut portion 23 for a same purpose.

The material of the rear housing 1 and front housing 2 is Nylon, which is featured in lower shrinkage rate and high temperature resistance, and taper piston 3 and lock washer 6 are made the copper-based powder metallurgy materials, to ensure high precision and tightness.

The present invention provides an auto decompression valve, in which a lock washer 6 is mounted between the rear and front housings 1 and 2, and air goes out through the air release hole 11 of the rear housing 1 and the air release groove 61 of the lock washer 6, the parts are thus assembled altogether more tightly. The valve not only can maintain sufficient pressure for inflating tires, but also can control the air leaking flow during deflation, thereby providing better inflation and deflation effects. In addition, the rib 21 in the front housing 2 can prevent the taper piston 3 from being stuck in the bore of the front housing 2, and the sealing O-rings 7, 8 and the sealing washer 9 can help hold all the parts air tight. The materials for front and rear housings 1 and 2, Nylon, and the materials for the taper piston 3 and lock washer 6, copper based powder metallurgy materials, are featured in low shrinkage rate and high temperature resistance, providing higher precision.

The invention claimed is:

1. An auto decompression valve, comprising:
   a rear housing with an air release hole;
   a front housing which is screwed with said rear housing;
   a taper piston which is moveably mounted in said rear housing;
   a spring, one of which end is disposed in a corresponding cavity of said front housing, and another end is sleeved on the cylinder end of said taper piston;
   a lock washer with an air release groove, which is secured between said front and rear housings.

2. The auto decompression valve according to claim 1, wherein said lock washer is provided with an annular groove for receiving a first sealing O-ring.

3. The auto decompression valve according to claim 1, further comprising a sealing washer mounted between said front housing and lock washer.

4. The auto decompression valve according to claim 1, wherein said front housing is provided with a rib, which defines a U shaped groove with the inner wall of said front housing, for receiving a second sealing O-ring.

5. The auto decompression valve according to claim 1, wherein said front housing is provided with a hexagonal nut portion.

6. The auto decompression valve according to claim 1, wherein said rear housing has a hexagonal end plate with lock grooves, correspondingly said lock washer has lock flanges engaged with said lock grooves.

7. The auto decompression valve according to claim 1, wherein said rear and front housings are made of Nylon materials.

8. The auto decompression valve according to claim 1, wherein said lock washer and said taper piston are made of copper-based powder metallurgy materials.

\* \* \* \* \*